US010805006B2

(12) United States Patent
Shen et al.

(10) Patent No.: US 10,805,006 B2
(45) Date of Patent: Oct. 13, 2020

(54) OPTICAL NETWORK PLANNING METHOD FOR ASYMMETRIC TRAFFIC TRANSMISSION OVER MULTI-CORE FIBER OPTICAL NETWORK AND NETWORK USING THE SAME

(71) Applicant: SOOCHOW UNIVERSITY, Suzhou (CN)

(72) Inventors: Gangxiang Shen, Suzhou (CN); Fengxian Tang, Suzhou (CN); Longfei Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 16/348,487

(22) PCT Filed: Sep. 13, 2018

(86) PCT No.: PCT/CN2018/105346
§ 371 (c)(1),
(2) Date: May 8, 2019

(87) PCT Pub. No.: WO2019/114346
PCT Pub. Date: Jun. 20, 2019

(65) Prior Publication Data
US 2020/0266894 A1 Aug. 20, 2020

(30) Foreign Application Priority Data

Dec. 13, 2017 (CN) .......................... 2017 1 1329884

(51) Int. Cl.
*H04B 10/25* (2013.01)
*H04J 99/00* (2009.01)
(Continued)

(52) U.S. Cl.
CPC ............. *H04B 10/25* (2013.01); *H04B 10/27* (2013.01); *H04J 15/00* (2013.01); *H04B 10/556* (2013.01); *H04J 14/02* (2013.01); *H04Q 11/00* (2013.01)

(58) Field of Classification Search
CPC ...... H04B 10/25; H04B 10/27; H04B 10/556; H04B 10/2581; H04J 15/00; H04J 14/02; H04Q 11/00
(Continued)

(56) References Cited

U.S. PATENT DOCUMENTS 10,148,356 B2 * 12/2018 Benner ............... H04J 14/0227
10,382,843 B2 * 8/2019 Xia .......................... H04J 14/04
(Continued)

FOREIGN PATENT DOCUMENTS

CN 101621447 A 1/2010
CN 103338162 A 10/2013
(Continued)

OTHER PUBLICATIONS

"Experimental Demonstration of a Flexible Filterless and Bidirectional SDM Optical Metro/Inter-DC Network", G. M. Saridis et al., Sep. 2016 (Year: 2016).*

*Primary Examiner* — Abbas H Alagheband
(74) *Attorney, Agent, or Firm* — SZDC Law PC (57) ABSTRACT

The application discloses an optical network planning method for asymmetric traffic transmission over a multi-core fiber optical network and a network using the same. The method comprises: acquiring an asymmetric traffic demand over a multi-core fiber optical network to obtain a target service; establishing a corresponding route depending on the target service, and selecting cores in a multi-core fiber and allocating corresponding frequency slots in an interleaving and counter-propagating manner to each link along the route to optimize optical network planning and design. With the method provided by the application, through selecting cores in a multi-core fiber and allocating corresponding frequency slots in an interleaving and counter-propagating manner to each link along the route, the inter-core crosstalk is suppressed and network capacity efficiency is increased, thereby optimizing optical network planning and design for (Continued)

traffic transmission over the multi-core fiber optical network.

5 Claims, 4 Drawing Sheets

(51) Int. Cl.
  *H04B 10/27*   (2013.01)
  *H04J 14/02*   (2006.01)
  *H04Q 11/00*   (2006.01)
  *H04B 10/556*  (2013.01)

(58) Field of Classification Search
  USPC .................................................. 398/43
  See application file for complete search history.

(56) References Cited

U.S. PATENT DOCUMENTS

| | | | | |
|---|---|---|---|---|
| 10,432,316 | B2* | 10/2019 | Cavaliere | H04B 10/503 |
| 2005/0158047 | A1* | 7/2005 | Way | H04B 10/032 |
| | | | | 398/59 |
| 2006/0187972 | A1* | 8/2006 | Aono | H04J 14/0227 |
| | | | | 370/535 |
| 2011/0274398 | A1* | 11/2011 | Fini | G02B 6/02042 |
| | | | | 385/124 |
| 2011/0274435 | A1* | 11/2011 | Fini | H04J 14/02 |
| | | | | 398/139 |
| 2014/0161404 | A1* | 6/2014 | Fini | G02B 6/0365 |
| | | | | 385/126 |
| 2014/0241712 | A1* | 8/2014 | Sugawara | H04J 14/029 |
| | | | | 398/5 |
| 2014/0270776 | A1* | 9/2014 | Jinno | H04J 14/0204 |
| | | | | 398/69 |
| 2018/0063607 | A1* | 3/2018 | Xia | H04Q 11/0001 |
| 2018/0076921 | A1* | 3/2018 | Koopferstock | H04J 14/0221 |
| 2018/0246275 | A1* | 8/2018 | Saito | G02B 6/02342 |

FOREIGN PATENT DOCUMENTS

| | | |
|---|---|---|
| CN | 106992945 A | 7/2017 |
| CN | 107959528 A | 4/2018 |
| WO | 2010072425 A | 7/2010 |

* cited by examiner

OPTICAL NETWORK PLANNING METHOD FOR ASYMMETRIC TRAFFIC TRANSMISSION OVER MULTI-CORE FIBER OPTICAL NETWORK AND NETWORK USING THE SAME

This application is the National Stage Application of PCT/CN2018/105346, filed on Sep. 13, 2018, which claims priority to Chinese Patent Application No.: 201711329884.5, filed on Dec. 13, 2017, which is incorporated by reference for all purposes as if fully set forth herein.

FIELD OF THE INVENTION

The present invention relates to the technical field of optical communication, particularly to a network planning method for asymmetric traffic transmission over multi-core fiber optical network and network using the same.

BACKGROUND OF THE INVENTION

Figure 1:
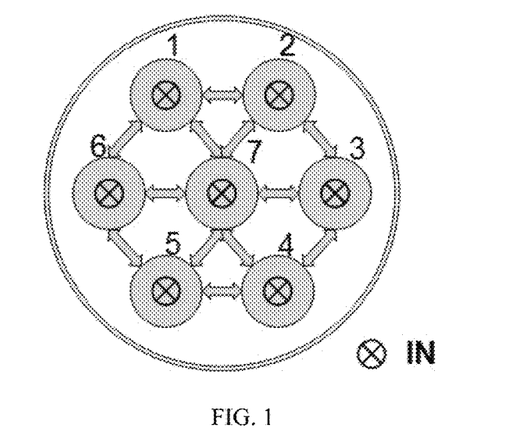
FIG. 1 shows schematically co-propagating traffic transmission over an MCF optical network in prior art.

Modern fiber-optics communication technology over standard single-mode single core fibers is near its transmission capacity limit. To further increase the capacity, researchers are exploring Space-Division-Multiplexing (SDM) transmissions such as in Multi-Core Fiber (MCF)-based systems. Most current studies on MCF-based optical networks assume a pair of MCFs on each link with optical signals transmitted in opposite directions in each where the signals in all the cores are in the same direction, as shown in FIG. 1. This symmetric network design increases capacity, but is limited in an MCF as the inter-core crosstalk degrades the signal between cores.

Meanwhile, new applications, such as video on demand and Virtual/Augmented Reality (VR/AR) tend to have highly asymmetric bi-directional traffic in the opposite directions of a flow, which leads to highly asymmetric traffic demand in the network. However, almost all the current networks have been designed for symmetric traffic, provisioning the same capacity in both directions, and are not efficient for asymmetric flows.

In conclusion, there still exist some problems in MCF optical networks for asymmetric traffic such as inter-core crosstalk, inefficient MCF optical network resource utilization. Therefore, it is urgent for a person skilled in the art to solve the above technical problem to optimize the network traffic transmission when planning an MCF optical network.

SUMMARY OF THE INVENTION

In view of this, it is an objective of the present invention to provide an optical network planning method for asymmetric traffic transmission over an MCF optical network and a network using the same that optimize optical network planning for service transmission over an MCF optical network to reduce inter-core crosstalk in the MCF optical network and increase network capacity efficiency of MCF optical network during asymmetric traffic transmission. The present invention achieves this objective through specific solutions as follows.

An optical network planning method for asymmetric traffic transmission over an MCF optical network comprises:

acquiring an asymmetric traffic demand to be transmitted over the MCF optical network to obtain a target service; and establishing a corresponding route respectively depending on the target service, and selecting cores in a multi-core fiber and allocating corresponding frequency slots in an interleaving and counter-propagating manner to each link along the route to optimize optical network planning and design.

Optionally, the step of "establishing a corresponding route respectively depending on the target service, and selecting cores in a multi-core fiber and allocating corresponding frequency slots in an interleaving and counter-propagating manner to each link along the route to optimize optical network planning and design" comprises:

determining a target spectrum window for transmitting the target service depending on the target service, and establishing a corresponding target optical channel depending on the target spectrum window; and establishing a corresponding route respectively depending on the target optical channel, and selecting cores in a multi-core fiber and allocating corresponding frequency slots in an interleaving and counter-propagating manner to each link along the route to optimize optical network planning and design.

Optionally, the step of "determining a target spectrum window for transmitting the target service depending on the target service, and establishing a corresponding target optical channel depending on the target spectrum window" comprises:

determining a route for transmitting the target service with a shortest routing path algorithm depending on the target service, and establishing N spectrum windows depending on the traffic demands corresponding to the target service, and determining whether there is a multi-core fiber available to each spectrum window, wherein N is an integer no smaller than 1;

if there is a multi-core fiber available based on the spectrum window, establishing, by the multi-core fiber available, an optical channel for transmitting the target service;

creating an auxiliary graph for each spectrum window having a multi-core fiber available respectively, and based on the current spectrum window, calculating the corresponding cost of the using cores based on the auxiliary graph created; and scanning all the spectrum windows, determining the spectrum window with the lowest cost as the target spectrum window, and determining the optical channel corresponding to the target spectrum window as the target optical channel.

Optionally, the step of "determining whether there is a multi-core fiber available to each spectrum window" further comprises:

adding a new multi-core fiber when there is no multi-core fiber available to any spectrum window, to obtain a multi-core fiber available to the spectrum windows.

Optionally, the step of "creating an auxiliary graph for each spectrum window having a multi-core fiber available respectively, and based on the current spectrum window, calculating the corresponding cost of the using cores based on the auxiliary graph created" comprises:

creating an auxiliary graph for a spectrum window having a multi-core fiber available respectively, adding virtual nodes and establishing auxiliary links on the auxiliary graph created, and calculating the cost of auxiliary links along the route for transmitting the target service to obtain the select of optical cores and the corresponding cost based on the current spectrum window.

Optionally, in the step of "creating an auxiliary graph for a spectrum window having a multi-core fiber available respectively, adding virtual nodes and establishing auxiliary links on the auxiliary graph created, and calculating the cost of auxiliary links along the route for transmitting the target service to obtain the select of optical cores and the corresponding cost based on the current spectrum window", the cost for transmitting the target service over the auxiliary link is calculated as:

$$c = \sum_{i=1,\ldots,f-1} CF_i$$

wherein f represents the total number of frequency slots in the spectrum window, and $CF_i$ represents the inter-core crosstalk factor that has been increased for the i-th frequency slot in the current multi-core fiber with the optical channel established by the current link.

Accordingly, the present invention further provides a multi-core fiber optical network utilizing the optical network planning method for asymmetric traffic transmission over a multi-core fiber optical network as described above.

In the network planning method for asymmetric traffic transmission over an MCF optical network provided by the present invention, firstly, a target service is obtained by acquiring an asymmetric traffic demand to be transmitted over the MCF optical network; then a corresponding route is established respectively depending on the target service, and optical cores in a multi-core fiber are selected and corresponding frequency slots are allocated to each link along the route in an interleaving and counter-propagating manner to optimize optical network planning and design. It can be seen that with the optical network planning method for asymmetric traffic transmission over an MCF optical network provided by the present invention, through selecting cores in a multi-core fiber and allocating corresponding frequency slots in an interleaving and counter-propagating manner to each link along the route to suppress the inter-core co-propagating crosstalk in the MCF optical network and improve network capacity efficiency of MCF optical network resources, thereby optimizing optical network planning and design for traffic transmission over the MCF optical network.

BRIEF DESCRIPTION OF THE DRAWINGS

For clearer explanation of the embodiments of the present invention or the technical solutions in the prior art, the drawings needed in description of the embodiments or the prior art will be described briefly in the following. It is apparent that the drawings in the following description illustrate only the embodiment of the present invention. Other drawings can be obtained based on the presented drawings by a person of ordinary skill in the art without creative efforts.

DETAILED DESCRIPTION OF THE EMBODIMENTS

The technical solutions in the embodiments of the present invention will be described clearly and completely in the following with reference to the accompanying drawings in the embodiments of the present invention. It is apparent that the embodiments described are only some of the embodiments of the present invention, but not all the embodiments thereof. All other embodiments obtained by a person of ordinary skill in the art based on the embodiments of the present invention without creative efforts shall fall within the scope of the present invention.

Figure 2:
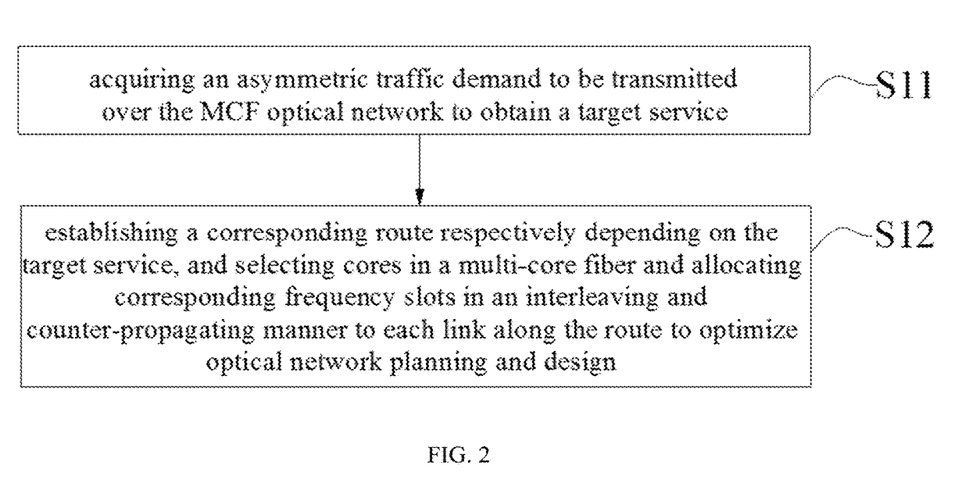
FIG. 2 shows a flowchart of an optical network planning method for traffic transmission over an MCF optical network according to an embodiment of the present invention.

An embodiment of the present invention discloses an optical network planning method for asymmetric traffic transmission over an MCF optical network, as shown in FIG. 2, which comprises the following steps.

Step S11, an asymmetric traffic demand to be transmitted over the MCF optical network is acquired to obtain a target service.

It is to be noted that the term "service" as used in an embodiment of the present invention means an asymmetric traffic, including but not limited to new applications such as video on demand, VR/AR, and Webcasting. Specifically, in Webcasting, a network anchor sends data messages such as videos continuously to a terminal of the audience. The terminal of the audience feeds back data messages such as pictures and text discontinuously to the network anchor. As the traffic volume of data messages such as videos sent continuously is much larger than that of data messages such as pictures and text sent discontinuously, the service of webcasting transmission is an asymmetric traffic service.

Step S12, a corresponding route is established depending on the target service and cores in a multi-core fiber are selected and corresponding frequency slots are allocated in an interleaving and counter-propagating manner to each link along the route to optimize optical network planning and design.

It is to be noted that the target task service can be divided into multiple sub-services for transmission. The number of optical cores needed for co-propagation and counter-propagation transmission of the target service is calculated depending on the traffic volume in opposite directions in the target service, a corresponding route is established respectively, and optical cores in a multi-core fiber are selected and corresponding frequency slots are allocated in an interleaving and counter-propagating manner. Interleaving and counter-propagating allocation of optical cores is used because in an MCF, counter-propagating allocation of optical cores enables counter-propagation of signals on neighboring optical cores, thereby significantly suppressing the inter-core crosstalk.

In conclusion, in the optical network planning method for asymmetric traffic transmission over an MCF optical network provided by the embodiments of the present invention, firstly, a target service is obtained by acquiring an asymmetric traffic demand to be transmitted over the MCF optical network; then a corresponding route is established respectively depending on the target service, and optical cores in a multi-core fiber are selected and corresponding frequency slots are allocated to each link along the route in an interleaving and counter-propagating manner to optimize optical network planning and design. It can be seen that with the optical network planning method for asymmetric traffic transmission over an MCF optical network provided by the embodiments of the present invention, through selecting cores in a multi-core fiber and allocating corresponding frequency slots in an interleaving and counter-propagating manner to each link along the route to suppress the inter-core co-propagating crosstalk in the MCF optical network and improve network capacity efficiency of MCF optical network resources, thereby optimizing optical network planning and design for traffic transmission over the MCF optical network.

Figure 3:
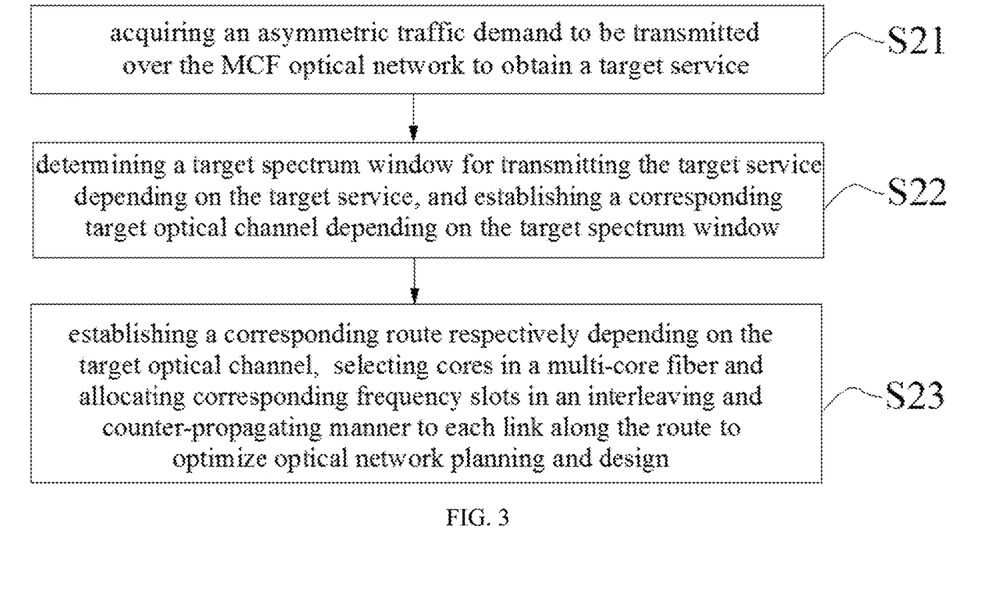
FIG. 3 shows a flowchart of an optical network planning method for traffic transmission over another MCF optical network according to an embodiment of the present invention.

An embodiment of the present invention further provides another optical network planning method for asymmetric traffic transmission over an MCF optical network, as shown in FIG. 3, which comprises the following steps.

Step S21, an asymmetric traffic demand to be transmitted over the MCF optical network is acquired to obtain a target service.

Step S22, a target spectrum window for transmitting the target service is determined depending on the target service, and a corresponding target optical channel is established depending on the target spectrum window.

It is to be noted that the algorithm used in Step S22 in this embodiment of the present invention can be a heuristic algorithm. Since the heuristic algorithm is proposed by the present invention for the first time, any idea adopting such a heuristic algorithm under a different name shall fall within the scope of the present invention. Furthermore, a spectrum window algorithm may be used for determination of the spectrum window.

In an embodiment of the present invention, Step S22 may comprise the following sub-steps:

determining a route for transmitting the target service with a shortest routing path algorithm depending on the target service, and establishing N spectrum windows depending on the traffic demands, and determining whether there is a multi-core fiber available to each spectrum window, wherein N is an integer greater than 1;

if there is a multi-core fiber available based the spectrum window, establishing, by the multi-core fiber available, an optical channel for transmitting the target service;

creating an auxiliary graph for each spectrum window having a multi-core fiber available respectively, and based on the current spectrum window, calculating the corresponding cost of the using cores based on the auxiliary graph created; and scanning all the spectrum windows, determining the spectrum window with the lowest cost as the target spectrum window, and determining the optical channel corresponding to the target spectrum window as the target optical channel.

It is further to be noted that, the step of "determining whether there is a multi-core fiber available to each spectrum window" further comprises: adding a new multi-core fiber when there is no multi-core fiber available to any spectrum window, to obtain a multi-core fiber available to the spectrum windows.

The above sub-step of "creating an auxiliary graph for each spectrum window having a multi-core fiber available respectively, and based on the current spectrum window, calculating the corresponding cost of the using cores based on the auxiliary graph created" comprises:

creating an auxiliary graph for a spectrum window having a multi-core fiber available respectively, adding virtual nodes and establishing auxiliary links on the auxiliary graph created, and calculating the cost of auxiliary links along the route for transmitting the target service to obtain the select of optical cores and the corresponding cost based on the current spectrum window.

The cost for transmitting the target service over the auxiliary link is calculated as:

$$c = \sum_{i=1,\ldots,f-1} CF_i$$

wherein f represents the total number of frequency slots in the spectrum window, and $CF_i$ represents the inter-core crosstalk factor that has been increased for the i-th frequency slot in the current multi-core fiber with the optical channel established by the current link.

Step S23, establishing a corresponding route respectively depending on the target optical channel, selecting cores in a multi-core fiber and allocating corresponding frequency slots in an interleaving and counter-propagating manner to each link along the route to optimize optical network planning and design.

An embodiment of the present invention further provides a particular implementation of an optical network planning method for asymmetric traffic transmission over an MCF optical network, as shown in FIGS. 4 to 8.

Before description is made to the particular implementation mentioned above, firstly, reduction of inter-core crosstalk through selecting cores in a multi-core fiber and allocating corresponding frequency slots in an interleaving and counter-propagating manner is described by way of calculating crosstalk factor.

Figure 4:
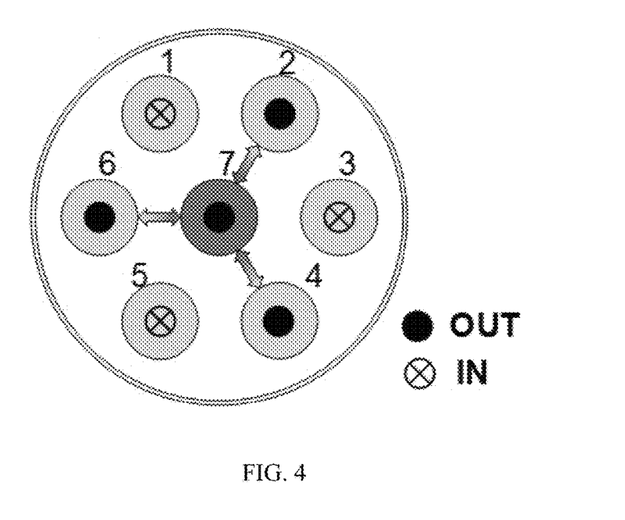
FIG. 4 shows schematically counter-propagating traffic transmission over an MCF optical network according to an embodiment of the present invention.

FIG. 1 shows a 7-core MCF where all the optical signals are transmitted in the same direction, and FIG. 4 shows a 7-core MCF which counter-propagates optical signals. FIG. 1 and FIG. 4 illustrate two modes to propagate optical signals respectively. In an MCF optical network designed for bi-directionally symmetric traffic demands, as shown in FIG. 1, the cores co-propagate signals, where all the optical signals are transmitted in the same direction. This can lead to significant inter-core crosstalk limiting its transmission capacity. To suppress inter-core crosstalk, the cores in an MCF counter-propagate optical signals, as shown in FIG. 4.

The best results from this counter-propagation mode are achieved in FIG. 4 by properly arranging the cores that are propagating in opposite directions. The inter-core (co-propagating) crosstalk factor (CF) for a core is defined to be the number of other cores in the same MCF that are directly neighboring to the current core and transmitting optical channels of the same frequencies in the same direction as in the current core. Here directly neighboring core are the ones with no other intervening core in the middle. In a particular implementation of the embodiment of the present invention, we ignore the crosstalk between co-propagating cores that are not directly neighboring as it would be much less than that between directly neighboring co-propagating cores. As shown in FIG. 1, cores 1 and 2 are examples of directly neighboring cores. For comparing the inter-core crosstalk between the core layouts in FIG. 1 and FIG. 4, we can calculate that the total inter-core crosstalk factor of MCF shown in FIG. 1 as $CF_{co}=24$, and that of MCF shown in FIG.

4 as $CF_{counter}=6$. It can be seen that counter-propagation significantly suppresses the inter-core crosstalk for an MCF.

Figure 5:
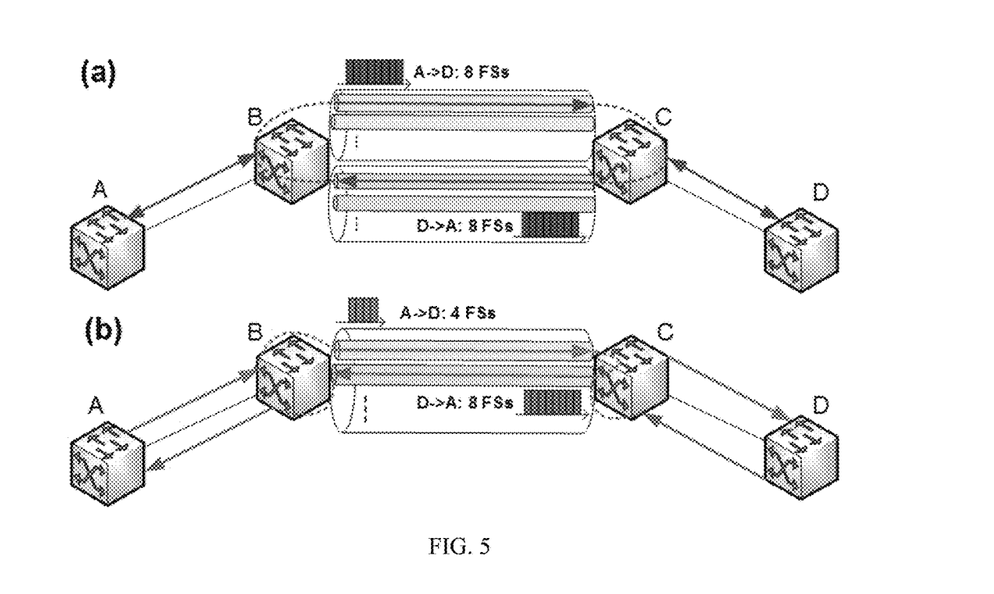
FIG. 5 shows schematically traffic transmission over an MCF optical network in a particular implementation of an embodiment of the present invention.

In an MCF optical network, for asymmetric network traffic, FIG. 5 shows examples of MCF layout on a fiber link for symmetric design traffic and optical core and frequency allocation in counter-directional transmission one based on counter-propagation. In FIG. 5 (a), since each fiber link needs to support bi-directional traffic and no counter-propagation is allowed for the cores in an MCF, a pair of MCFs have to be deployed in opposite directions between nodes B and C. In contrast, using core counter-propagation in an MCF, only one MCF is needed between nodes B and C, where traffic in opposite directions is sent using a pair of counter-propagating cores. Moreover, in the symmetric design, the spectrum resources reserved in both directions would be the same and is set to be the larger of the values in the two directions. Thus, in FIG. 5 (a), 8 frequency slots are reserved in both the opposite MCFs. A design based on counter-propagating cores can flexibly allocate spectrum resources to match the actual demand. With bi-directional traffic asymmetry, 8 frequency slots are allocated in the direction from C to B, but only 4 frequency slots are needed in the opposite direction. Unlike the example of FIG. 5 (a), the core counter-propagation mode in FIG. 5 (b) reduces 4 frequency slots and is more efficient for bi-directional asymmetric demand.

A particular implementation of an optical network planning method for asymmetric traffic transmission over an MCF optical network will be described below in detail.

Given an optical channel request that requires f frequency slots and is to be established along the shortest route between its source and destination nodes, we try each possible f frequency slot spectrum window, (i.e., from FSs $\lambda_i$ to $\lambda_{i+f-1}$, wherein i=1, 2, 3 . . . ) along the route to first check whether each link can provide such a free spectrum window. If there is any link that cannot provide such a spectrum window, we record the total number $l_i$ of such links for this spectrum window; otherwise $l_i$=0.

We then repeat the same process for the next f frequency slot spectrum window (i.e., from FSs $\lambda_{i+1}$ to $\lambda_{i+f}$) to find $l_{i+1}$. After scanning all the spectrum windows, we find the smallest $$l_i \text{ as } l_{min} = \min_i l_i. \text{ If } l_{min} = 0,$$

which means that at least one spectrum window is eligible to establish the current optical channel along the route, then we implement an auxiliary graph (AG)-based algorithm to jointly assign the MCF core and frequency slots along the route. We will introduce this AG-based algorithm later. Otherwise, if $l_{min}$>0, we will find the first spectrum window i* whose $l_i$=$l_{min}$, and then add $l_{min}$ MCFs on the links that lack spectrum window i* which would ensure to add the fewest MCFs and enable the current route to be available on the spectrum window i* on all the links. Based on this, we can then run the subsequent AG-based algorithm to jointly assign the MCF core and frequency slots along the route.

Figure 6:
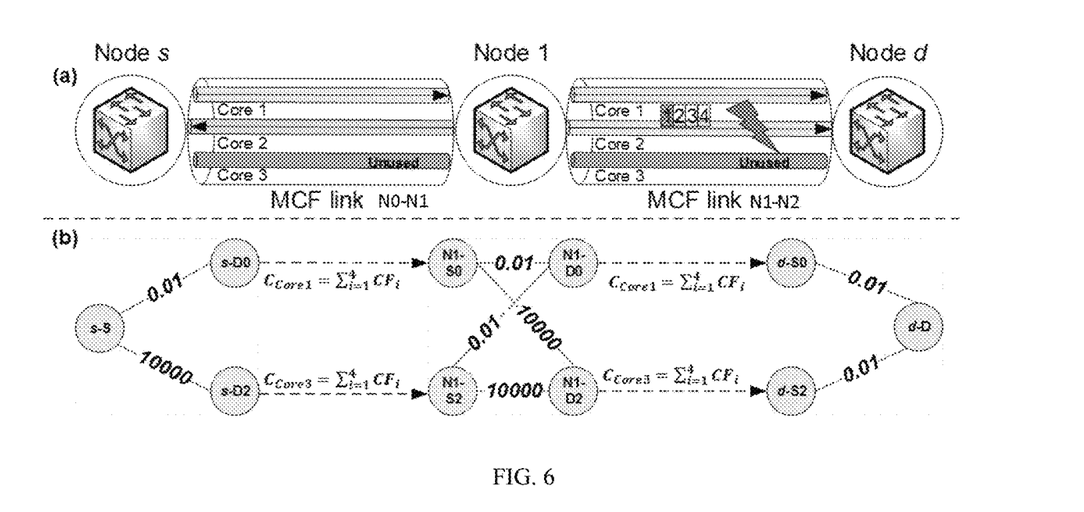
FIG. 6 shows schematically creating an auxiliary graph and calculating traffic transmission cost in an MCF optical network in a particular implementation of an embodiment of the present invention.

It is to be noted that the particular process of implementation of the auxiliary graph is shown in FIG. 6, and is described in detail as follows.

Assume that the route traverses two MCF links, as shown in FIG. 6 (a). An auxiliary graph as shown in FIG. 6 (b) is created based on the current route. By traversing through all the spectrum windows, an MCF core that is not used yet or carries traffic in the direction from s to d and has available spectrum window is mapped to a unidirectional auxiliary link connecting two auxiliary nodes. See the examples of core 3 in link 1 for the unused core and core 1 in link 1 for the other case.

If an MCF core carries traffic in the opposite direction (e.g., core 2 in link 1) or is not available of the spectrum window (e.g., core 2 in link 2, not available of the current spectrum window), then no corresponding auxiliary link is set up. The cost of each auxiliary link on an MCF link is set as:

$$c = \sum_{i=1,\dots,f-1} CF_i$$

where f represents the total number of frequency slots in the spectrum window, and $CF_i$ represents the increase of inter-core crosstalk factor of frequency slot i in the current MCF if the optical channel is established via the link.

Next, to inter-connect MCF cores via a virtual node, as shown in FIG. 6 (b), each node is split into two parts and auxiliary links are added to fully connect auxiliary nodes on both sides. In particular, an auxiliary node for a source node has one front end, shown as s-S in FIG. 6. Similarly, the destination node has only one end, shown as d-D in FIG. 6. The cost of each auxiliary link is set as follows. If its destination virtual node corresponds to an unused MCF core, then its cost is set to be large, e.g. $10^4$, to avoid using this unused core before using up spectrum resources on other used cores. Otherwise, the cost is set to be small, e.g. 0.01. For nodes s and d, auxiliary links are added similarly.

Finally, the number of MCFs and the inter-core crosstalk factor corresponding to the first-fit (FF) and the least cost (LC) are calculated. Based on the auxiliary graph created, the shortest path searching algorithm is run to find a path with the lowest cost for the current spectrum window, $c_i^{SW}$. Next, the two strategies above, i.e., the first-fit strategy and least cost strategy are implemented. The first one is to use the first eligible SW that has $c_i^{SW}<\infty$ to establish the optical channel. The second one needs to scan all the eligible SWs for the lowest cost one, i.e., $$i^* = \arg\min_i c_i^{SW}.$$

The process of calculating the number of MCFs needed for the first-fit and least cost and the corresponding crosstalk factor is specifically as follows. We evaluated the proposed strategy for the 11-node, 26-link COST239 and 14-node, 21-link NSFNET networks. A 7-core MCF was assumed for this simulation study though other types of MCFs are also possible. In each core of an MCF, there are a total of 320 FSs available, and the spectrum assignment for each optical channel is elastic as in the conventional elastic optical network (EON). A total of 500 bi-directional optical channel requests were simulated. Each request consists of two unidirectional optical channels between the node pair. The bandwidth of each unidirectional optical channel is independently assumed to follow a random distribution within a range of [5, 2X-5] FSs, where X is the average number of FSs required. Here, the number of FSs for each optical channel request can be derived from the actual bandwidth requirement between the corresponding node pair and the modulation format that can be used according to the distance or signal quality of the optical channel. To account for the asymmetry, we assigned a larger bandwidth to unidirectional optical channels whose source node index is larger than that of the destination node, and vice-versa in the other direction. It is to be noted that we always used the shortest route based on the physical distance between each node pair for optical channel establishment. The AG-based algorithm was employed to choose the cores and spectrum windows for optical channels for the networks based on the core counter-propagation and the conventional symmetric designs.

Figure 7:
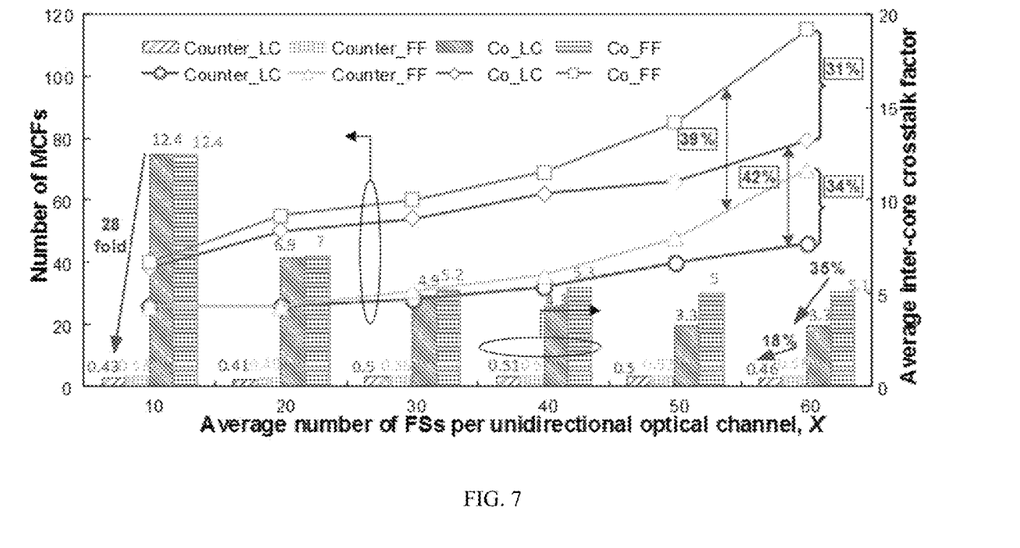
FIG. 7 shows schematically the number of multi-core fibers and inter-core crosstalk with a first-fit strategy and a least cost strategy in a particular implementation of an embodiment of the present invention.

Next, we first evaluate how the total number of MCFs required (calculated as the sum of MCFs on each network link) changes with an increasing average number of FSs assigned to each unidirectional optical channel. The results for COST239 are shown in FIG. 7, where the legends of "Counter" and "Co" corresponds to the design cases of core counter-propagation and core co-propagation in each MCF, respectively. We use the legends of "FF" and "LC" to denote the core and spectrum selection strategies in the AG-based algorithm. The left y-axis shows the number of MCFs required. It can be seen from FIG. 7 that, with the increase in the average number of FSs assigned to each channel, the number of MCFs increases, as more bandwidth is needed. Comparing the counter-propagation and co-propagation cases, we see that the former significantly reduces the number of MCFs required by up to 39% and 42%, respectively for the FF and LC strategies. In addition, the LC strategy outperforms the FF strategy by more than 30% because it chooses the core and spectrum with the fewest unused cores and the least inter-core crosstalk, thereby improving network capacity efficiency for traffic of MCF network.

FIG. 7 also compares the inter-core (co-propagating) crosstalk between different schemes (see the right y-axis). We use the average inter-core crosstalk factor per FS of each channel, calculated as $\overline{CF} = \Sigma_{i \in L, f \in W} CF_i^f \Sigma_{d \in D} FS_d$, to measure the inter-core crosstalk. L is the set of network links, W is the set of FSs in each core, and D is the set of unidirectional optical channels established. $CF_i^f$ is the inter-core crosstalk factor of FS f in link i. $FS_d$ is the number of FSs required by optical channel d. Compared to the co-propagation case, the counter-propagation case always shows lower inter-core crosstalk, reducing up to more than 28 fold under low traffic demand (e.g., X=10) for both FF and LC strategies. Also, the LC strategy shows a lower inter-core crosstalk than that of the FF strategy by choosing the core and spectrum with the lowest crosstalk.

Figure 8:
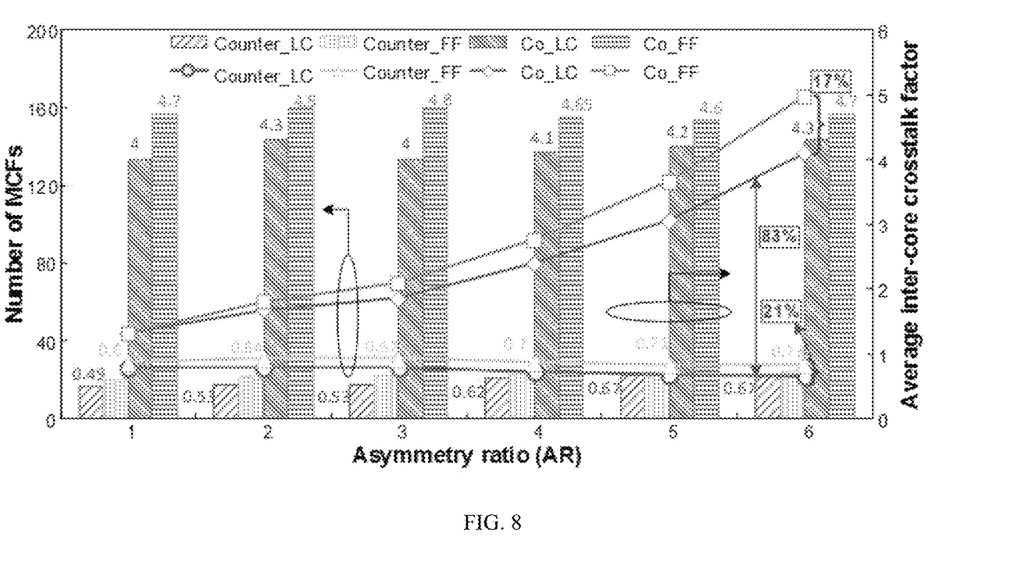
FIG. 8 shows impact of traffic asymmetry ratio under the first-fit strategy and the least cost strategy in a particular implementation of an embodiment of the present invention.

Finally, we evaluate how the asymmetry ratio of bi-directional traffic demand impacts the benefit of core counter-propagation under X=15 for NSFNET (see FIG. 8). We see that with an increasing asymmetry ratio, the difference in the number of MCFs becomes more with counter-propagation performing much better than co-propagation, by up to 83%. A large difference in the inter-core crosstalk between the two schemes still maintains with a small increase in the inter-core crosstalk by the counter-propagation mode due to stronger traffic asymmetry. It can be seen that with the network planning method for asymmetric traffic transmission over an MCF optical network provided by this particular implementation, through interleaving and counter-propagating allocation of optical cores in a multi-core fiber and corresponding frequency slots, the inter-core crosstalk in the MCF optical network is suppressed and MCF optical network capacity efficiency is increased, thereby optimizing optical network planning for traffic transmission over the MCF optical network.

Finally, it is also to be noted that as used herein, relational terms such as first and second, etc., are only used to distinguish one entity or operation from another entity or operation, and do not necessarily require or imply any such actual relationship between or sequence of these entities or operations. Moreover, the terms "comprise", "include", or any other variation thereof are intended to encompass a non-exclusive inclusion, such that a process, method, article, or apparatus that comprises a list of elements comprises not only those elements but also other elements not expressly listed or elements inherent to such a process, method, article, or apparatus. Without further limitation, an element defined by the statement "comprising a(n) . . . " does not exclude the presence of another identical element in the process, method, article, or apparatus that comprises the element.

The network planning method for asymmetric traffic transmission over an MCF optical network and the network using the same provided by the present invention have been described in detail. The principles and implementations of the present invention have been explained by way of specific examples. The description of the embodiments above is merely intended to assist in understanding the method and essential concept of the present invention. Meanwhile, changes may be made in specific implementations and applications by those of ordinary skill in the art based on the concept of the present invention. In summary, the disclosure in this specification shall not be construed as limiting the invention.

What is claimed is:

1. An optical network planning method for asymmetric traffic transmission over a multi-core fiber optical network, comprising:
   acquiring an asymmetric traffic demand to be transmitted over the multi-core fiber optical network to obtain a target service; and
   establishing a corresponding route respectively depending on the target service, and selecting cores in a multi-core fiber and allocating corresponding frequency slots in an interleaving and counter-propagating manner to each link along the route to optimize optical network planning and design,
   wherein the step of "establishing the corresponding route respectively depending on the target service, and selecting cores in a multi-core fiber and allocating corresponding frequency slots in the interleaving and counter-propagating manner to each link along the route to optimize optical network planning and design" comprises:
      determining a target spectrum window for transmitting the target service depending on the target service, and establishing a corresponding target optical channel depending on the target spectrum window; and
      establishing the corresponding route respectively depending on the target optical channel, selecting cores in a multi-core fiber and allocating corresponding frequency slots in the interleaving and counter-propagating manner to each link along the route to optimize optical network planning and design, and
   wherein the step of "determining a target spectrum window for transmitting the target service depending on the target service, and establishing the corresponding target optical channel depending on the target spectrum window" comprises:
      determining a route for transmitting a target service with a shortest routing path algorithm depending on the target service, and establishing N spectrum windows depending on the traffic demands corresponding to the target service, and determining whether there is a multi-core fiber available to each spectrum window, wherein N is an integer greater than 1;

if there is a multi-core fiber available based on the spectrum window, establishing, by the multi-core fiber available, an optical channel for transmitting the target service;

creating an auxiliary graph for each spectrum window having a multi-core fiber available respectively, and based on the current spectrum window, calculating the corresponding cost of the using cores based on the auxiliary graph created; and scanning all the spectrum windows, determining the spectrum window with the lowest cost as the target spectrum window, and determining the optical channel corresponding to the target spectrum window as the target optical channel.

2. The optical network planning method for asymmetric traffic transmission over a multi-core fiber optical network of claim 1, wherein the step of "determining whether there is a multi-core fiber available to each spectrum window" further comprises:

adding a new multi-core fiber when there is no multi-core fiber available to any spectrum window, to obtain a multi-core fiber available to the spectrum windows.

3. The optical network planning method for asymmetric traffic transmission over a multi-core fiber optical network of claim 1, wherein the step of "creating an auxiliary graph for each spectrum window having a multi-core fiber available respectively, and based on the current spectrum window, calculating the corresponding cost of the using cores based on the auxiliary graph created" comprises:

creating an auxiliary graph for a spectrum window having a multi-core fiber available respectively, adding virtual nodes and establishing auxiliary links on the auxiliary graph created, and calculating the cost of auxiliary links along the route for transmitting the target service to obtain the select of optical cores and the corresponding cost based on the current spectrum window.

4. The optical network planning method for asymmetric traffic transmission over a multi-core fiber optical network of claim 3, wherein in the step of "creating an auxiliary graph for a spectrum window having a multi-core fiber available respectively, adding virtual nodes and establishing auxiliary links on the auxiliary graph created, and calculating the cost of auxiliary links along the route for transmitting the target service to obtain the select of optical cores and the corresponding cost based on the current spectrum window", the cost for transmitting the target service over the auxiliary link is calculated as:

$$c = \sum_{i=1,\ldots,f-1} CF_i$$

where f represents the total number of frequency slots in the spectrum window, and $CF_i$ represents the inter-core crosstalk factor that has been increased for the i-th frequency slot in the current multi-core fiber with the optical channel established by the current link.

5. A multi-core fiber optical network using the optical network planning method for asymmetric traffic transmission over a multi-core fiber optical network of claim 1.

* * * * *